L. PRENTICE.
Cigar-Molds.

No. 158,309. Patented Dec. 29, 1874.

Witnesses.
C. G. C. Simpson
John H. Rennie

Inventor.
L. Prentice

UNITED STATES PATENT OFFICE.

LOUIS PRENTICE, OF MONTREAL, CANADA.

IMPROVEMENT IN CIGAR-MOLDS.

Specification forming part of Letters Patent No. 158,309, dated December 29, 1874; application filed November 20, 1874.

*To all whom it may concern:*

Be it known that I, LOUIS PRENTICE, of the city of Montreal, in the district of Montreal and Province of Quebec, Canada, cigar manufacturer, have invented certain new and useful Improvements on Cigar-Molds; and I do hereby declare that the following is a full, clear, and exact description of the same.

The design of my invention is to render cigars more easy to smoke, and to cause them to burn more evenly; to which end it consists in the hereinafter-described molds, provided with transverse openings, through which the head of the cigar may be punctured or incised while in said molds, substantially as is specified.

Figure 1:
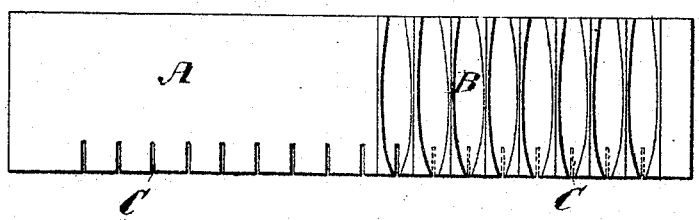
Figure 2:
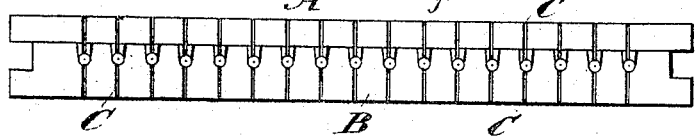
Figure 3:
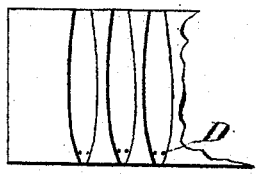
Figure 4:
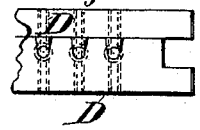
Figure 5:
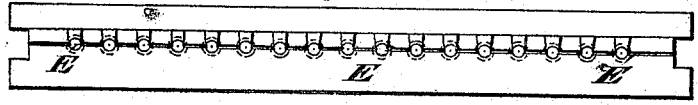

In the drawings hereunto annexed similar letters of reference indicate like parts; and Figure 1 is a plan embodying my invention, and showing the mold with a portion of upper half removed. Fig. 2 is a side elevation of Fig. 1. Fig. 3 is a modification. Fig. 4 is a side elevation of Fig. 3. Fig. 5 is a second modification.

Letters A and B are the upper and lower halves of the ordinary cigar-mold used in forming the bunches or fillers into shape. These are constructed similarly in every respect to those at present in use, but with the following additions thereto: Each cigar-recess is provided with a cut, C, as shown in Figs. 1 and 2. This cut in the mold enables a knife of ordinary form to reach in and cut the head of the bunch while in the mold.

The bunch is first prepared and enveloped in the binder; the whole is then placed one in each recess. The two parts of the mold, A and B, are then placed together and pressed. In case of too much material being situated at the head of the cigar, it being covered up by the mold, it cannot be seen and discovered; then, by making the cut at C the defect thus arising will be obviated. Should too much material be placed in the tuck, as the molds are open at this end it can always be discovered.

In the modification shown in Figs. 3 and 4, instead of the cut C small holes D are made, passing through both halves of the mold. These are one or more to each recess, as shown in the drawings. There are two to each recess.

When the bunch has been prepared, enveloped in the binder, and placed one in each recess, as above described, a suitable steel-wire skewer is run through the mold, and consequently penetrates through the bunch and binder.

In the modification shown in Fig. 5, the cut E is exactly the same as that shown in Figs. 1 and 2, with the exception that it is made lengthwise with the mold instead of transversely, and by drawing a knife down this cut each of the heads of the bunch will be treated in a similar manner to that described for Figs. 1 and 2.

What I claim as my invention is as follows:

As an improvement in mechanism for manufacturing cigars, a two-part mold provided with transverse openings, through which the head of a cigar may be punctured or incised, substantially as and for the purpose specified.

Montreal, 12th day of November, A. D. 1874.

L. PRENTICE.

Signed in the presence of—
C. G. C. SIMPSON,
JOHN A. RENNIE.